United States Patent [19]

Beckmann et al.

[11] Patent Number: 5,502,135
[45] Date of Patent: Mar. 26, 1996

[54] COPOLYMERS BASED ON DICARBOXIMIDES, ALKENYL ISOCYANATES AND/OR ALKENYLURETHANES

[75] Inventors: Stefan Beckmann, Bad Dürkheim; Rudolf Zentel, Nierstein; Michael Doerr, Wiesbaden; Manfred Eich, Mühltal, all of Germany

[73] Assignee: BASF Aktiengesellschaft, Ludwigshafen, Germany

[21] Appl. No.: 401,612

[22] Filed: Mar. 9, 1995

[30] Foreign Application Priority Data

Mar. 11, 1994 [DE] Germany .................. 44 08 199.5

[51] Int. Cl.$^6$ .................. C08F 222/40; C08F 226/02
[52] U.S. Cl. .................. 526/262; 526/310; 526/301; 526/302
[58] Field of Search ........................ 526/262, 301, 526/302, 310

[56] References Cited

U.S. PATENT DOCUMENTS 4,988,787  1/1991  Mormann et al. .................. 526/262

FOREIGN PATENT DOCUMENTS

| 0334176 | 9/1989 | European Pat. Off. . |
| 0396172 | 11/1990 | European Pat. Off. . |
| 2597109 | 10/1987 | France . |
| 2630744 | 11/1989 | France . |

OTHER PUBLICATIONS

Synthetic Metals, vol. 37, pp. 207–221, 1990, G. R. Mohlmann, "Developments of Optically Nonlinear Polymers and Devices".

Electronics Letters, vol. 26, No. 14, pp. 981–982, Jul. 5, 1990, M. Amano, et al., "Second–Order Nonlinearity of a Disazo Dye Attached Polymer".

Journal of Polymer Science: Part A: Polymer Chemistry, vol. 28, pp. 1–13, 1990, Douglas R. Robello, "Linear Polymers for Nonlinear Optics I. Polyacrylates Bearing Aminonitro–Stilbene and Azobenzene Dyes".

Makromol. Chem. Rapid Commun., vol. 13, pp. 377–384, 1992, W. Mormann, et al., "Polymers from Multifunctional Isocyanates, 8 Isocyanatoalkenes as Electron–Rich Monomers: Alternating Copolymers from Vinyl Isocyanate and Maleic Anhydride".

Macromol. Rapid Commun., vol. 15, pp. 935–942, Dec. 1994, M. Dorr, et al., "Polymers with Nonlinear Optical Properties and High Glass Transition Temperatures by Functionalization of Reactive Precursors".

Primary Examiner—Joseph L. Schofer
Assistant Examiner—Wu C. Cheng
Attorney, Agent, or Firm—Oblon, Spivak, McClelland, Maier & Neustadt

[57] ABSTRACT

A copolymer based on monomers selected from the group consisting of dicarboximides, alkenyl isocyanates and alkenylurethanes of formula I:

$$-[CR^1-CR^2R^3]_a-[CR^1-CR^2R^3]_b-[CR^4-CR^5]_c-M_d- \quad I$$

where
$R^1$ to $R^5$, $R^6$, X, Y, Z, M, and a–d are as defined in the specification.

5 Claims, No Drawings

COPOLYMERS BASED ON DICARBOXIMIDES, ALKENYL ISOCYANATES AND/OR ALKENYLURETHANES

The present invention relates to copolymers based on dicarboximides, alkenyl isocyanates and/or alkenylurethanes, processes for their preparation and their use in nonlinear optics.

Polymers having pendant nonlinear optical chromophores and their preparation by free radical polymerization of ethylenically unsaturated organic compounds (methacrylic and acrylic compounds) which carry nonlinear optical (=NLO) chromophores as pendant groups are known and are described, for example, by D. R. Robello in J. Polym. Sci; Part A: Polymer Chemistry 28 (1990), 1, M. Amano and T. Kaino, Electron. Lett. 26 (1990), 981, and G. R. Möhlmann, Synthetic Metals, 37, (1990), 207, and in EP-A-0337405, EP-A-0334176, EP-A-0396172, FR-A-2630744 and FR-A-2597109.

DE-A-41 16 594 has also proposed a process for the preparation of (meth)acrylate polymers having pendant nonlinear optical chromophores by polymer-analogous reaction of polymers of (meth)acryloyl chloride with D-ω-hydroxyalkyl chromophores. To ensure that such polymers have NLO activity and a high 2nd order susceptibility, the pendant groups must be oriented in an electric field (cf. P. N. Prasad and D. J. Williams, Introduction to Nonlinear Optical Effects in Molecules and Polymers, J. Wiley and Sons, New York 1991). This is usually done in the region of the glass transition temperature, where the pendant groups are very mobile. The orientation achieved in the field is then frozen by cooling. A disadvantage of these polymers is the excessively rapid relaxation of the oriented pendant groups. This relaxation currently prevents the production of optical components having long-term stability.

It is an object of the present invention to provide copolymers by means of which the relaxation after orientation of the radicals having nonlinear optical activity in the correspondingly substituted copolymers is prevented or slowed down.

We have found that this object is achieved by copolymers based on dicarboximides, alkenyl isocyanates and/or alkenylurethanes of the general formula I

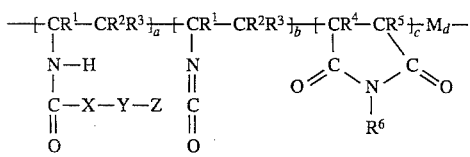

where
$R^1$, $R^2$, $R^3$, $R^4$ and $R^5$, independently of one another, are each hydrogen or $C_1$–$C_{20}$-alkyl which may contain hetero atoms and/or may be substituted;
$R^6$ is hydrogen or $C_1$–$C_{10}$-alkyl which is unsubstituted or substituted by phenyl or hydroxyl, or is $C_3$–$C_8$-cycloalkyl, or is phenyl or benzyl, each of which is unsubstituted or substituted by 1 to 4 $C_1$–$C_6$-alkyl or $C_1$–$C_6$-alkoxy groups, or is phenethyl, diphenylmethyl, naphthyl, carbazoyl, isobornyl, adamantyl or 9-fluorenyl;
X is O or NH;
Y is methylene, ethylene, propylene, isopropylene, straight-chain or branched $C_4$–$C_{20}$-alkylene,

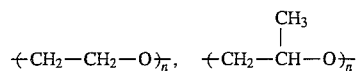

where n is from 1 to 15,
Z is hydrogen or an unsubstituted or substituted radical D having nonlinear optical properties;
M is any copolymerizable monomer and a+b+c+d=1, where
a and c may each be from 0.3 to 0.7 and
b and d may each be from 0 to 0.3.

The present invention furthermore relates to a process for the preparation of these copolymers by reacting from 30 to 70 mol % of a compound of the general formula III $$CR^1=CR^2R^3, \quad \text{III}$$
$$|$$
$$N=C=O$$

with from 30 to 70 mol % of a compound of the general formula IV

and, if required, up to 30 mol % of further monomers which differ from the compounds III and IV, in the presence of a free radical initiator, and subsequently reacting the resulting copolymer with a compound of the formula H—X—Y—Z, and the use of the copolymers in nonlinear optics.

In the novel copolymers,

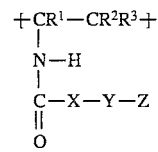

is preferably

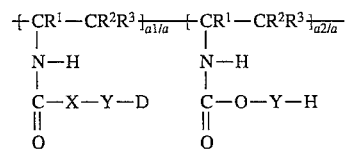

where
a1/a and a2/a are each from 0.1 to 0.9 and a1+a2=a.
In the novel copolymers, $R^1$, $R^2$, $R^3$, $R^4$ and $R^5$ are each preferably hydrogen.

According to the invention, suitable alkenyl isocyanates are those of the general formula III $$CR^1=CR^2R^3, \quad \text{III}$$
$$|$$
$$N=C=O$$

where $R^1$, $R^2$ and $R^3$, independently of one another, are each hydrogen or $C_1$–$C_{20}$-alkyl which may contain hetero atoms and/or may be substituted.

These alkenyl isocyanates are known per se or can be prepared by rearrangement reactions of suitable electron-deficient nitrogen compounds. The unsubstituted vinyl isocyanate ($R^1=R^2=R^3$=hydrogen) preferably used according to the invention is obtainable, for example, by a Curtius reaction starting from acryloyl chloride. For this purpose, acrylic acid azide is first prepared from acryloyl chloride by means of sodium azide, for example in a toluene/water mixture at 0° C., and the acrylic acid azide is isolated and then thermally decomposed at 70° C., the Curtius rearrangement to the isocyanate taking place with elimination of nitrogen (cf. W. Mormann and K. Schmalz in Makromolekulare Chemie, Rapid Communications, 13 (1992), 377–384).

Further isocyanates are described in Journal of Macromolecular Science-Chemistry, A5(6) (1971), 1057–1062, and in Journal für praktische Chemie, 320 (1978), 473 et seq. The compounds of the formula III are used in an amount of from 30 to 70, preferably from 40 to 65, particularly preferably from 45 to 55, mol %.

According to the invention, suitable dicarboxamides are compounds of the formula IV

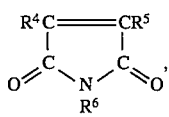

where $R^4$ and $R^5$, independently of one another, are each hydrogen or $C_1$–$C_{20}$-alkyl which may contain hetero atoms and/or may be substituted and $R^6$ is hydrogen or $C_1$–$C_{10}$-alkyl which is unsubstituted or substituted by phenyl or hydroxyl, or is $C_3$–$C_8$-cycloalkyl, or is phenyl or benzyl, each of which is unsubstituted or substituted by from 1 to 4 $C_1$–$C_6$-alkyl or $C_1$–$C_6$-alkoxy groups, or is phenethyl, diphenylmethyl, naphthyl, carbazoyl, isobornyl, adamantyl or 9-fluorenyl.

In a preferred embodiment of the invention, $R^6$ is phenyl or benzyl, each of which is unsubstituted or substituted by from 1 to 4 $C_1$–$C_6$-alkyl or $C_1$–$C_6$-alkoxy groups, or is phenethyl, diphenylmethyl, naphthyl, carbazoyl, isobornyl, adamantyl or 9-fluorenyl.

According to the invention, maleimides, in particular the maleimides 1–6, are particularly preferably used.

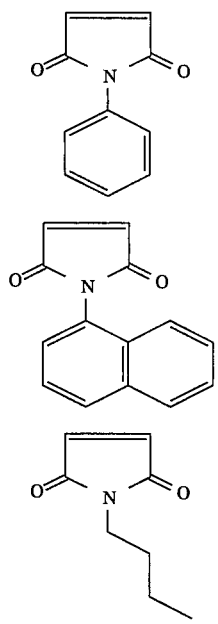

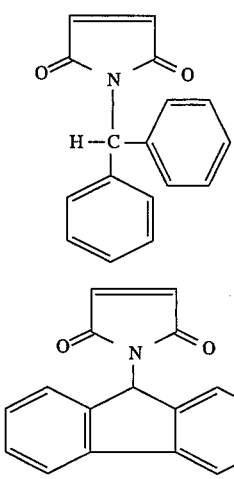

The novel maleimides can be prepared, for example, by the following two processes (cf. M. K. Hargreaves, J. G. Pritchard and H. R. Dave, Cyclic Carboxylic Monoimides, Chem. Rev. 70 (1970), 439 et seq.): the simplest method is the reaction of maleic anhydride with the corresponding amine with virtually quantitative yield to give the opened monoamide. The conversion to the imide is carried out, as a rule, in a second step by means of a dehydrating reagent, for example acetic anhydride or phosphorus pentoxide.

eg.:

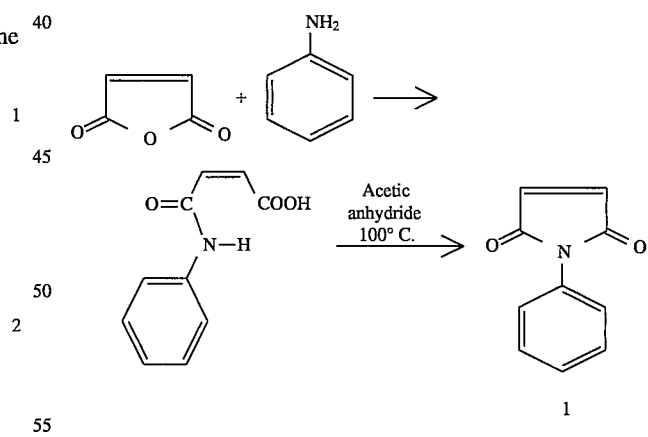

This synthesis route was advantageously taken, for example, for the monomers 1, 2 and 3.

The second possibility can be used in particular for sterically bulky radicals $R^6$ which can stabilize a carbonation in the transition state. For this purpose, the corresponding silver salt is prepared from the unsubstituted maleimide with silver nitrate. Said salt is then reacted with the desired halide to give the N-substituted maleimide (cf. A. Schwartz and M. Lerner, Journal of Organic Chemistry, 39 (1974), 21 et seq.). The monomers 4, 5 and 6 are, for example, advantageously obtainable in this manner.

eg.:

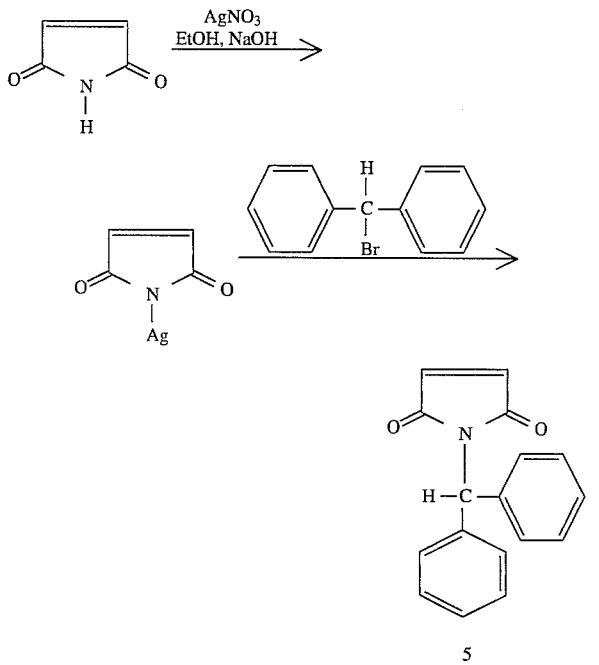

According to the invention, the compounds of the formula IV are used in an amount of from 30 to 70, preferably from 40 to 65, particularly preferably from 45 to 55, mol %.

The novel copolymers contain, if required, any monomer M which is copolymerizable with the other monomers.

Examples of suitable monomers M are

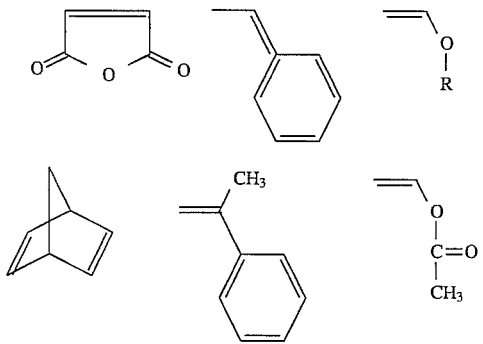

The monomer M is used in an amount of up to 30, preferably up to 20, mol %.

If the novel copolymers contain no monomers M, the monomers derived from the compounds of the formulae III and IV are present, as a rule, in alternating form in the copolymer.

The novel copolymers can be prepared, for example, by first reacting the compounds of the formula III partially or completely with compounds of the formula H—X—Y—Z and then reacting the modified monomers obtained in this manner with compounds of the formula IV and, if required, monomers M in the presence of free radical initiators. This may be followed by a reaction of the copolymer obtained in this manner with further compounds of the formula H—X—Y—Z.

According to the invention, however, a process for the preparation of the novel copolymers by reaction of compounds of the formula III with compounds of the formula IV and, if required, monomers M in the presence of free radical initiators and subsequent polymer-analogous reaction of the resulting copolymer with compounds of the formula H—X—Y—Z is preferred.

The polymerization of the compounds of the formula III, IV and, where relevant, monomers M is generally carried out by free radical copolymerization in an inert solvent (eg. benzene or toluene) at from 50° to 90° C., preferably from 60° to 80° C., using suitable initiators.

The novel copolymers preferably contain a radical X—Y—Z in which Z is hydrogen or an unsubstituted or substituted radical D having nonlinear optical properties. As a rule, from 1 to 80%, preferably from 10 to 30% of the groups Z are a radical D and from 20 to 99%, preferably from 70 to 90%, of the groups Z are hydrogen.

In a preferred embodiment of the invention, a radical of the general formula V

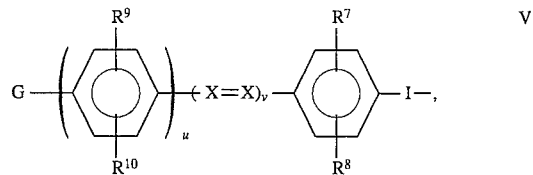

where
$R^7$ to $R^{10}$ are identical or different and are each H, straight-chain or branched $C_1-C_{10}$-alkyl, $C_1-C_{10}$-alkoxy or $C_3-C_7$-cycloalkyl,
I is O or $NR^{11}$,
$R^{11}$ is H, $C_1-C_{10}$-alkyl, $C_3-C_7$-cycloalkyl, phenyl, benzyl or phenethyl,
u and v are each 0 or 1,
X is CH or N and
G is CN, $NO_2$, dicyanovinyl, tricyanovinyl, CHO or $CH=C(CO_2R^{11})$,
is used as radical D having nonlinear optical properties.

In a further preferred embodiment of the invention, a radical of the general formula VI

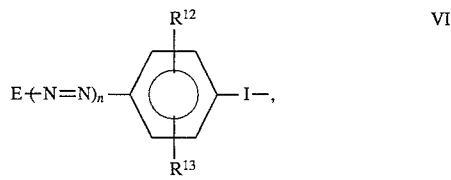

where
n is 0 or 1,
$R^{12}$ and $R^{13}$, independently of one another, are each hydrogen, straight-chain or branched $C_1-C_{10}$-alkyl, $C_1-C_{10}$-alkoxy or $C_3-C_7$-cycloalkyl,
I is O or $NR^{14}$,
$R^{14}$ is hydrogen, $C_1-C_{10}$-alkyl, $C_3-C_7$-cycloalkyl,

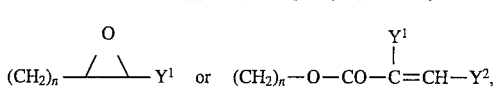

where n is 0 or 1, $y^1$ is hydrogen or methyl and $y^2$ is hydrogen or phenyl, and
E is a radical of a diazo component which is derived from a five-membered aromatic heterocyclic amine which has from one to three hetero atoms selected from the group consisting of nitrogen, oxygen and sulfur in the heterocyclic ring and may be fused with a benzene, thiophene, pyridine or pyrimidine ring,
is used as radical D having nonlinear optical properties.

The novel use of azo dyes of the formula VI, where E is a radical of a diazo component which is derived from a heterocyclic amine from the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzoisothiazole, pyridothiophene, pyrimidothiophene or thienothiazole series, is preferred.

The use of azo dyes of the formula VI, where E is the radical of a diazo component which is derived from a heterocyclic amine from the pyrrole, thiophene, pyrazole, thiazole, isothiazole, triazole, thiadiazole, benzothiophene, benzothiazole, benzoisothiazole, pyridothiophene, pyrimidothiophene or thienothiazole series, is particularly preferred.

Of particular importance is the use of azo dyes of the formula VI, where
E is a radical of the formula

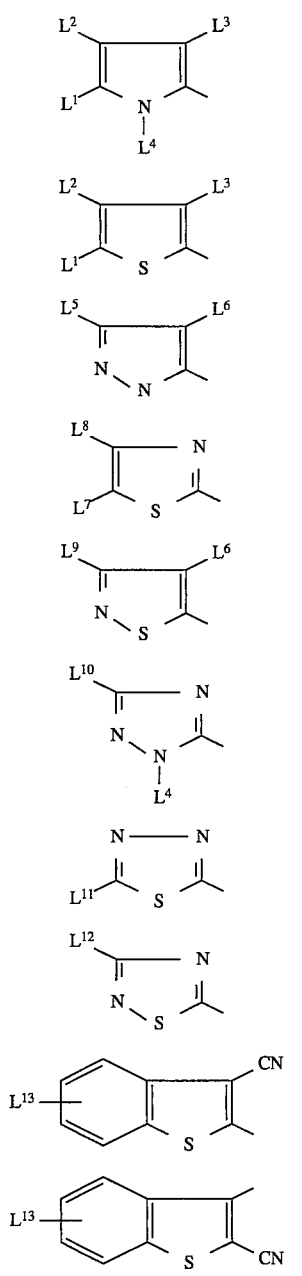
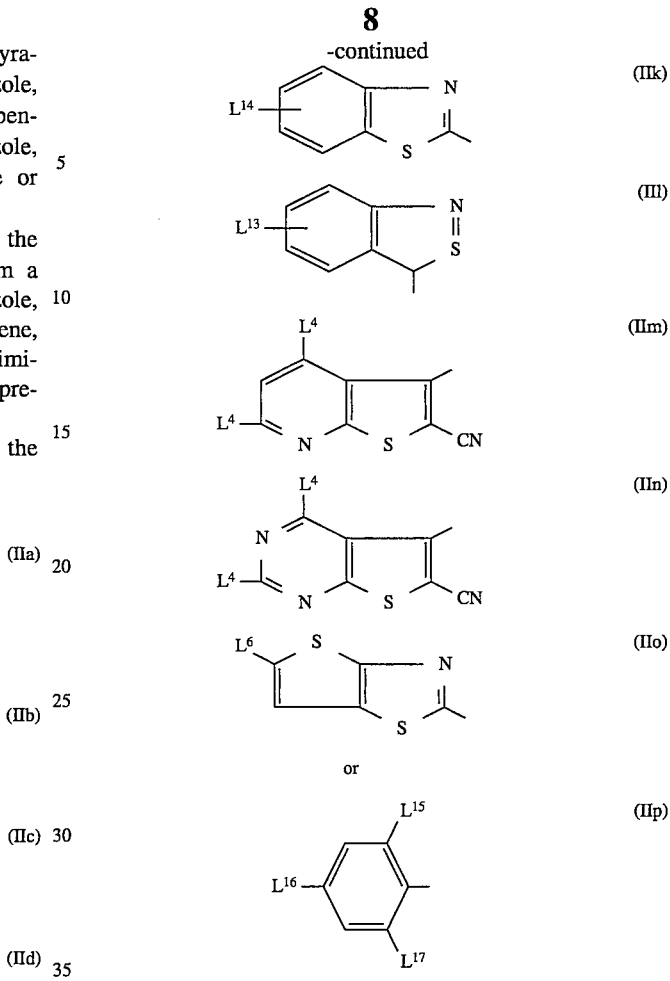

where $L^1$ is nitro, cyano, $C_1$-$C_6$-alkanoyl, benzoyl, $C_1$-$C_6$-alkylsulfonyl, unsubstituted or substituted phenylsulfonyl or a radical of the formula —CH=T, where T is hydroxyimino, $C_1$-$C_4$-alkoxyimino or a radical of a CH-acidic compound, $L^2$ is hydrogen, $C_1$-$C_6$-alkyl, halogen, hydroxy, mercapto, unsubstituted or phenyl- or $C_1$-$C_4$-alkoxy-substituted $C_1$-$C_6$-alkoxy, unsubstituted or substituted phenoxy, unsubstituted or phenyl-substituted $C_1$-$C_6$-alkylthio, unsubstituted or substituted phenylthio, $C_1$-$C_6$-alkylsulfonyl or unsubstituted or substituted phenylsulfonyl, $L^3$ is cyano, $C_1$-$C_4$-alkoxycarbonyl or nitro, $L^4$ is hydrogen, $C_1$-$C_6$-alkyl or phenyl, $L^5$ is $C_1$-$C_6$-alkyl or phenyl, $L^6$ is hydrogen, cyano, $C_1$-$C_4$-alkoxycarbonyl, $C_1$-$C_6$-alkanoyl, thiocyanato or halogen, $L^7$ is nitro, cyano, $C_1$-$C_6$-alkanoyl, benzoyl, $C_1$-$C_4$-alkoxycarbonyl, $C_1$-$C_6$-alkylsulfonyl, unsubstituted or substituted phenylsulfonyl or a radical of the formula —CH=T, where T has the abovementioned meanings, $L^8$ is hydrogen, $C_1$-$C_6$-alkyl, cyano, halogen, unsubstituted or phenyl- or $C_1$-$C_4$-alkoxy-substituted $C_1$-$C_6$-alkoxy, unsubstituted or phenyl-substituted $C_1$-$C_6$-alkylthio, unsubstituted or substituted phenylthio, $C_1$-$C_6$-alkylsulfonyl, unsubstituted or substituted phenylsulfonyl or $C_1$-$C_4$-alkoxycarbonyl, $L^9$ is cyano, unsubstituted or phenyl-substituted $C_1$-$C_6$-alkyl, unsubstituted or phenyl-substituted $C_1$-$C_6$-alkylthio, unsubstituted or substituted phenyl, thienyl, $C_1$-$C_4$-alkylthienyl, pyridyl or $C_1$-$C_4$-alkylpyridyl, $L^{10}$ is phenyl or pyridyl, $L^{11}$ is trifluoromethyl, nitro, $C_1$–$C_6$-alkyl, phenyl, unsubstituted or phenyl-substituted $C_1$–$C_6$-alkylthio or $C_1$–$C_6$-dialkylamino, $L^{12}$ is $C_1$–$C_6$-alkyl, phenyl, 2-cyanoethylthio or 2-($C_1$–$C_4$-alkoxycarbonyl)ethylthio, $L^{13}$ is hydrogen, nitro or halogen, $L^{14}$ is hydrogen, cyano, $C_1$–$C_4$-alkoxycarbonyl, nitro or halogen and $L^{15}$, $L^{16}$ and $L^{17}$ are identical or different and, independently of one another, are each hydrogen, $C_1$–$C_6$-alkyl, $C_1$–$C_6$-alkoxy, halogen, nitro, formyl, cyano, $C_1$–$C_4$-alkoxycarbonyl, $C_1$–$C_6$-alkylsulfonyl or unsubstituted or substituted phenylsulfonyl, or $L^{16}$ may furthermore be unsubstituted or nitro-substituted phenylazo.

All alkyl groups occurring in the abovementioned formulae V and VI may be either straight-chain or branched.

If substituted phenyl groups occur in the abovementioned formulae V and VI, suitable substituents are, for example, $C_1$–$C_4$-alkyl, chlorine, bromine, nitro or $C_1$–$C_4$-alkoxy, unless stated otherwise. The phenyl radicals have as a rule from 1 to 3 substituents.

$L^2$, $L^4$, $L^5$, $L^8$, $L^9$, $L^{11}$, $L^{12}$, $L^{15}$, $L^{16}$ and $L^{17}$ are, for example, methyl, ethyl, propyl, isopropyl, butyl, isobutyl, sec-butyl, pentyl, isopentyl, neopentyl, tert-pentyl, hexyl or 2-methylpentyl.

$L^9$ may furthermore be, for example, benzyl or 1- or 2-phenylethyl.

$L^2$, $L^8$, $L^9$ and $L^{11}$ may furthermore be, for example, methylthio, ethylthio, propylthio, isopropylthio, butylthio, isobutylthio, pentylthio, hexylthio, benzylthio or 1- or 2-phenylethylthio.

$L^2$ and $L^8$ may furthermore be, for example, phenylthio, 2-methylphenylthio, 2-methoxyphenylthio or 2-chlorophenylthio.

$L^2$, $L^8$, $L^{15}$, $L^{16}$ and $L^{17}$ may furthermore be, for example, methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^6$ as well as $L^2$, $L^8$, $L^{13}$, $L^{14}$, $L^{15}$, $L^{16}$ and $L^{17}$ are, for example, fluorine, chlorine or bromine.

$L^7$ as well as $L^1$, $L^2$, $L^8$, $L^{15}$, $L^{16}$ and $L^{17}$ are, for example, methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

$L^3$ as well as $L^6$, $L^7$, $L^8$, $L^{14}$, $L^{15}$, $L^{16}$ and $L^{17}$ are, for example, methoxycarbonyl, ethoxycarbonyl, propoxycarbonyl, isopropoxycarbonyl, butoxycarbonyl, isobutoxycarbonyl or sec-butoxycarbonyl.

$L^2$ and $L^8$ may furthermore be, for example, 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

$L^{11}$ may furthermore be, for example, dimethylamino, diethylamino, dipropylamino, diisopropylamino, dibutylamino, dipentylamino, dihexylamino or N-methyl-N-ethylamino.

$L^{12}$ may furthermore be, for example, 2-methoxycarbonylethylthio or 2-ethoxycarbonylethylthio.

$L^9$ may furthermore be, for example, phenyl, 2-, 3- or 4-methylphenyl, 2,4-dimethylphenyl, 2-, 3- or 4-methoxyphenyl, 2-, 3- or 4-chlorophenyl, 2-, 3- or 4-methoxyphenyl, 2- or 3-methylthienyl or 2-, 3- or 4-methylpyridyl.

$L^1$, $L^6$ and $L^7$ may furthermore be, for example, formyl, acetyl, propionyl, butyryl, pentanoyl or hexanoyl.

If $L^1$ or $L^7$ is —CH=T, where T is derived from a CH-acidic compound $H_2T$, suitable CH-acidic compounds $H_2T$ may be, for example, compounds of the formula

  (IIIa)

  (IIIb)

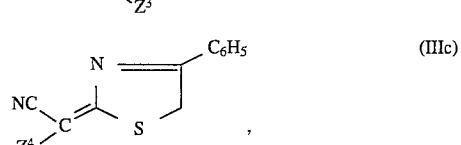  (IIIc)

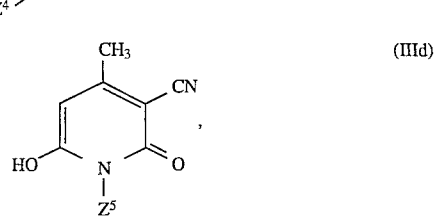  (IIId)

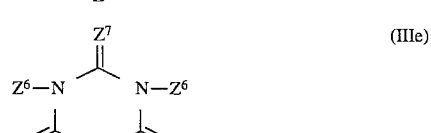  (IIIe)

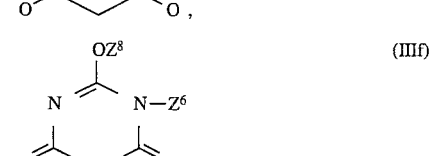  (IIIf)

or

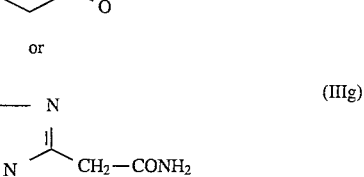  (IIIg)

where $Z^1$ is cyano, nitro, $C_1$–$C_4$-alkanoyl, unsubstituted or substituted benzoyl, $C_1$–$C_4$-alkylsulfonyl, unsubstituted or substituted phenylsulfonyl, carboxyl, $C_1$–$C_4$-alkoxycarbonyl, $C_3$–$C_4$-alkenyloxycarbonyl, phenoxycarbonyl, carbamoyl, $C_1$–$C_4$-mono- or dialkylcarbamoyl, unsubstituted or substituted phenylcarbamoyl, unsubstituted or substituted phenyl, benzothiazol-2-yl, benzimidazol-2-yl, 5-phenyl-1,3,4-thiadiazol-2-yl or 2-hydroxyquinoxalin-3-yl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl, $C_3$–$C_4$-alkenyloxycarbonyl, phenylcarbamoyl or benzimidazol-2-yl, $Z^4$ is cyano, $C_1$–$C_4$-alkoxycarbonyl or $C_3$–$C_4$-alkenyloxycarbonyl, $Z^5$ is hydrogen, $C_1$–$C_6$-alkyl, $C_1$–$C_4$-alkanoylamino or benzoylamino, $Z^6$ is hydrogen, $C_1$–$C_4$-alkyl or phenyl, $Z^7$ is oxygen or sulfur and $Z^8$ is $C_1$–$C_4$-alkyl.

The azo dyes of the formulae V and VI are known per se (cf. EP-A-0 201 896, DE-A-3 108 077, U.S. Pat. No. 4,843,153 or GB-A-1 546 803) or can be obtained via the methods stated there.

The novel copolymers may be uncrosslinked or crosslinked. Additional stabilization of the orientation can in principle be achieved by crosslinking. Since reactive groups occur in the polymers present, crosslinking reactions can be carried out without additional expense. Crosslinking reactions which start only at elevated temperatures, preferably during the polarization, and not as early as during the preparation of the copolymer film are advantageous here. For example, photochemical crosslinking reactions are suitable. Here, however, the absorption of the NLO chromophore should not be superposed on the absorption for the photoreaction, since the depth of penetration is otherwise small and photoreactions of the chromophores may take place. Moreover, although many reactions are only photochemically initiated, they may also take place thermally at elevated temperatures. For example, the reaction known in the literature, which gives allophanates and starts only at elevated temperature, is therefore preferably chosen as the crosslinking reaction.

A possible method for the preparation of novel crosslinked copolymers entails not reacting all isocyanate groups in the polymer-analogous reaction with compounds of the formula H—X—Y—Z. Crosslinking can then be effected, for example, by the reaction of unconverted isocyanates with available urethane groups with formation of allophanate groups.

In a further possible method of crosslinking, low molecular weight diisocyanates are added and can react with the available urethanes, also to give allophanate structures. Examples of these are aromatic diisocyanates, such as diphenylmethane 4,4'-diisocyanate.

The invention has a large number of advantages. Thus, the novel copolymers have high glass transition temperatures, and it is possible to vary the glass transition temperature to above 200° C. by varying the radicals. Moreover, the novel copolymers contain crosslinkable groups.

The novel copolymers are particularly suitable for the development of novel materials for NLO applications by orientation of the NLO chromophores in an electric field.

In addition, the novel copolymers make it possible to obtain, by polymer-analogous reactions, a large number of different polymers which have NLO activity and may also have crosslinkable groups.

Furthermore, the content of chromophores having nonlinear properties can be varied over a wide range in the novel copolymers. The corresponding copolymers having nonlinear optical properties have high values for the nonlinear optical effects in combination with high long-term stability and possess good layer-forming properties.

EXAMPLES

1. Preparation of the Isocyanate-containing Copolymers 11 to 16—Examples 1 to 6

The copolymers 11 to 16 were prepared and were then converted in polymer-analogous reactions into copolymers having nonlinear optical properties.

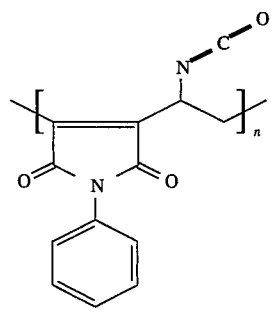

11

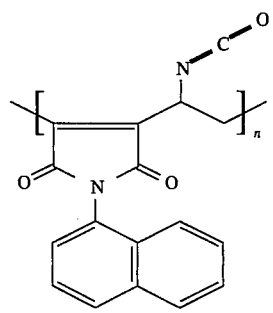

12

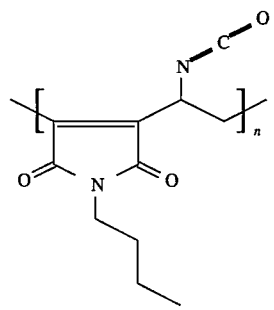

13

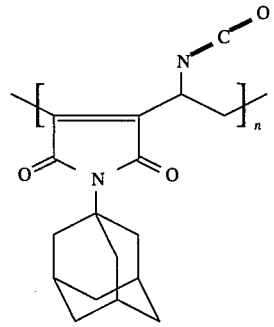

14

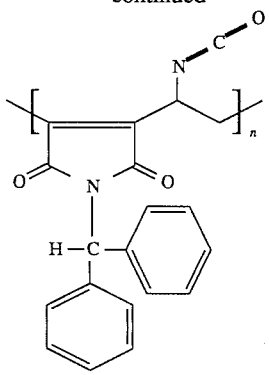

15

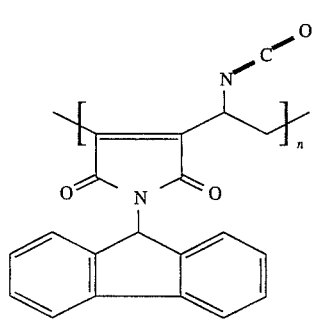

16

Example 1

Preparation of Copolymer 11

In a dry round-bottom flask, 5 g (29 mmol) of N-phenyl-maleimide and 2 g (29 mmol) of vinylisocyanate were dissolved in 35 ml of dry toluene. 100 mg of AIBN (azobisisobutyronitrile) were then added as an initiator. The reaction mixture was frozen and was degassed under reduced pressure, nitrogen was passed through and the mixture was thawed again. Polymerization was then carried out at 70° C. for 16 hours. The copolymer was precipitated during the reaction and was filtered off under suction through a reverse frit under nitrogen. In order to remove residual monomer, the copolymer was washed with dry benzene and dried at 90° C. under reduced pressure. 6.2 g (88% of theory) of copolymer 11 were obtained as a powder.

Elemental analysis:
Found [%] H: 4.45 C: 64.66 N: 11.39 0: 19.50
Calc. [%] H: 4.16 C: 64.46 N: 11.56 0: 19.81

| IR (KBr); v[cm$^{-1}$]: | 3068 | C—H | st (arom.) |
|---|---|---|---|
| | 2926 | C—H | st (aliph.) |
| | 2263 | N=C=O | st as |
| | 1780, 1711 | C=O | st |
| | 1597 | C=C | st (arom.) |
| | 1388 | CH$_2$ | δ |
| | 1191 | C—N | st (imide) |
| | 755 | CH$_2$ | γ |
| | 692 | C—H | δ oop. δ (arom. monosubst.) |

Example 2

Preparation of Copolymer 12

The procedure was as in Example 1, except that 1.88 g (8.4 mmol) of N-(1-naphthyl)-maleimide, 0.58 g (8.4 mmol) of vinyl isocyanate and 28 mg of AIBN in 60 ml of toluene were used. 0.8 g (32% of theory) of copolymer 12 was obtained as slightly yellowish powder.

Elemental analysis:
Found [%] H: 4.61 C: 70.14 N: 9.45 0: 15.80
Calc. [%] H: 4.14 C: 69.86 N: 9.58 0: 16.42

Example 3

Preparation of Copolymer 13

The procedure was as in Example 1, except that 3.65 g (24 mmol) of N-n-butylmaleimide, 1.65 g (24 mmol) of vinyl isocyanate and 80 mg of AIBN in 35 ml of toluene were used. 4.45 g (83% of theory) of copolymer 13 were obtained as a white powder.

Elemental analysis:
Found [%] H: 6.42 C: 59.63 N: 12.52 0: 21.43
Calc. [%] H: 6.35 C: 59.45 N: 12.60 0: 21.60

| IR (KBr); v[cm$^{-1}$]: | 2962, 2938, 2875 | C—H | st |
|---|---|---|---|
| | 2264 | N=C=O | st as |
| | 1777, 1697 | C=O | st |
| | 1440, 1405, 1350 | CH$_2$ | δ |
| | | CH$_3$ | δ sy |
| | 1193 | C—N | st (imide) |
| | 744 | CH$_2$ | γ |

Example 4

Preparation of Copolymer 14

The procedure was as in Example 1, except that 0.5 g (2.2 mmol) of N-(1-adamantyl)maleimide, 0.2 g (2.9 mmol) of vinyl isocyanate and 7 mg of AIBN in 20 ml of toluene were used. The copolymer was precipitated with dry petroleum ether, separated off by centrifuging and then dried at 90° C. under reduced pressure. 0.5 g (77% of theory) of copolymer 14 was obtained as a white powder.

Elemental analysis:
Found [%] H: 6.90 C: 68.11 N: 9.15 0: 15.84
Calc. [%] H: 6.71 C: 67.98 N: 9.33 0: 15.98

Example 5

Preparation of Copolymer 15

The procedure was as in Example 1, except that 1.5 g (5.7 mmol) of N-diphenylmethylmaleimide, 0.4 g (5.7 mmol) of vinyl isocyanate and 20 mg of AIBN in 10 ml of toluene were used. In addition, the copolymer remained for the most part in solution, so that it was precipitated with dry diethyl ether after the end of the polymerization. The copolymer was then separated off by centrifuging and dried at 90° C. under reduced pressure. 1.5 g (80% of theory) of copolymer 15 were obtained as a white powder.

$^1$H-NMR: 1.62 (2H); 2.0–3.4 (max at 2.4 and 2.8); 3.7–5.0 (max. 4.4, 1H); 6.3–6.6 (1H); 6.7–7.6 (1OH)

Elemental analysis:
Found [%] H: 4.90 C: 72.40 N: 8.21 0: 14.49
Calc. [%] H: 4.85 C: 72.28 N: 8.43 0: 14.44

| IR (KBr); v[cm$^{-1}$]: | 3092, 3068, 3037 | C—H | st (arom.) |
|---|---|---|---|
| | 2925, 2854 | C—H | st (aliph.) |
| | 2261 | N=C=O | st as |
| | 1779, 1708 | C=O | st |

| | | |
|---|---|---|
| 1603, 1586 | C=C | st (arom.) |
| 1450, 1388, 1360 | CH₂ | δ |
| 1193, 1173 | C—N | st (imide) |
| 744 | CH₂ | γ |
| 699 | C—H | δ oop. γ (arom.) |

Example 6

Preparation of Copolymer 16

The procedure was as in Example 1, except that 1.25 g (4.8 mmol) of N-(9-fluorenyl)-maleimide, 0.33 g (4.8 mmol) of vinyl isocyanate and 16 mg of AIBN in 20 ml of toluene were used. In addition, the copolymer remained for the most part in solution, so that it was precipitated with dry diethyl ether after the end of the polymerization, separated off by centrifuging and dried at 90° C. under reduced pressure. 0.8 g (50% of theory) of copolymer 16 was obtained as a white powder.

$^1$H-NMR: 1.8 (2H); 2.0–3.5 (max.); 5.5–6.5 (1H); 6.5–8.2 ( );

Elemental analysis:

Found [%] H: 4.15 C: 72.85 N: 8.52 O: 14.48

Calc. [%] H: 4.27 C: 72.72 N: 8.48 O: 14.53

| IR (KBr); ν[cm⁻¹]: | 3068, 3044, 3021 | C—H | st (arom.) |
|---|---|---|---|
| | 2921 | C—H | st (aliph.) |
| | 2259 | N=C=O | st |
| | 1778, 1708 | C—O | st |
| | 1611 | C=C | st (arom.) |
| | 1452, 1386 | CH₂ | δ |
| | 1202, 1173 | C—N | st (imide) |
| | 740 | CH₂ | γ |
| | 694 | C—H | δ oop. γ (arom.) |

2. Polymer-analogous Reactions of the Copolymers 11 to 16 With NLO Chromophores

The copolymers 11 to 16were reacted with the nucleophiles 8, 9 and 10 which have nonlinear optical properties, contain a hydroxyl-containing C₂ spacer and are obtainable according to B.T.M. Leslie, Mol. Cryst. Liq. Crystals 153 (1987) 451.

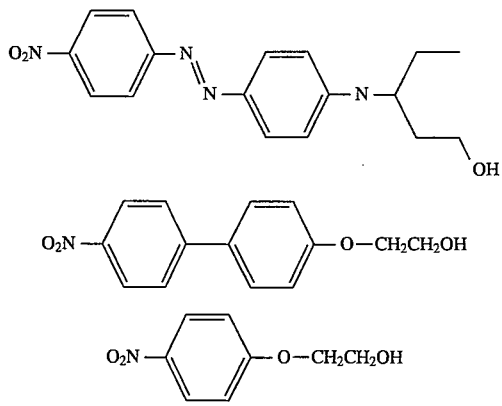

For this purpose, in particular copolymer and the chromophore are dissolved in dry methylene chloride and stirred at 40° C. for several days. After the end of the reaction, excess methanol was added and stirring was continued for a further 24 hours in order to convert the remaining isocyanate groups.

The incorporation of the chromophore was readily detectable from the IR spectrum. The isocyanate band disappeared and the carbonyl band was broadened by the additional stretching vibration of the urethane (about 1730 cm⁻¹). In addition, a broad band due to the N-H vibration appeared between 3100 and 3600 cm⁻¹. The incorporation of the dye could be detected from the more intensive aromatic vibrations at 1587 and 1600 cm⁻¹ and the additional appearance of the nitro vibrations at 1339 cm⁻¹.

The copolymer obtained was precipitated in diethyl ether and then extracted in a Soxhlet extractor with ether or petroleum ether in order to eliminate any contamination by unconverted chromophores. The copolymer obtained in each case in this manner and containing chemically bonded chromophores was then dissolved in an amount of methylene chloride which was sufficient to give a low-viscosity solution which could be forced through 0,2 μm microfilters. The filtered solution was evaporated down and the product was precipitated again and dried at 100° C. under reduced pressure.

The amounts used in the individual reactions are summarized in the Table. The Table also shows the percentage chromophore content of the copolymers obtained, based on the isocyanate groups originally present. The chromophore content was determined by UV spectroscopy, using concentration series of the low molecular weight dye. For example, the broad intense absorption band at $\lambda_{max}$=480 nm was used in the case of chromophore 8.

The diagram below illustrates, for copolymer 15, the reactions carried out and the structure of the resulting copolymers having NLO activity.

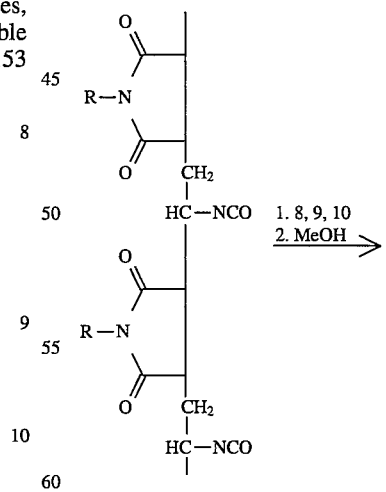

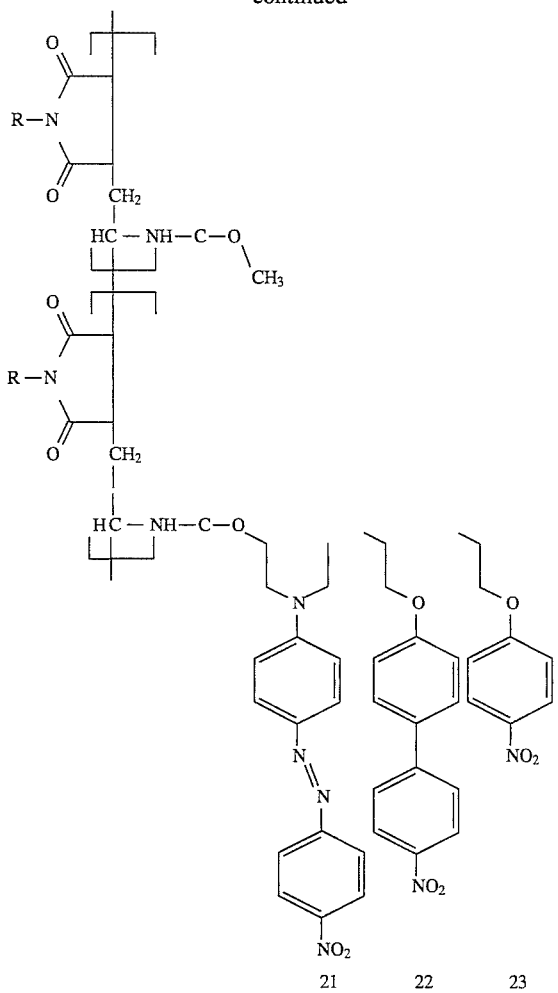

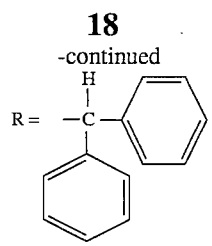

In addition, the copolymers 11 to 16 were reacted with sterically bulky nucleophiles. For this purpose, 242 mg (0.5 mmol) of each of the copolymers 11 to 16 were reacted with an excess of methanol or ethanol and 242 mg of each of the copolymers 11 and 13 were reacted with an excess of n-propylamine, in each case in 15 ml of dry methylene chloride, to give the corresponding urethanes and urea derivatives, respectively. The reactions carried out at room temperature took from 24 to 48 hours for complete conversion of the isocyanate groups, depending on the solubility of the copolymer. In the IR spectrum, the completeness of the reaction could be checked on the basis of the disappearance of the intense isocyanate band at about 2260 cm$^{-1}$.

TABLE

| Ex. | Copolymer | Amount mg (mmol) | Chromophore | Amount mg (mmol) | $CH_2Cl_2$ ml | Methanol ml | Reaction time Days | Yield mg | Dye content % |
|---|---|---|---|---|---|---|---|---|---|
| 7 | 15 | 167(0.5) | 10 | 18(0.1) | 10 | 1 | 6 | 154 | 20 |
| 8 | 15 | 167(0.5) | 9 | 26(0.1) | 10 | 1 | 10 | 165 | 20 |
| 9 | 15 | 167(0.5) | 8 | 31.4(0.1) | 10 | 1 | 10 | 165 | 20 |
| 10 | 15 | 206(0.62) | 8 | 24.3(0.77) | 20 | 1 | 6 | 190 | 10 |
| 11 | 15 | 100(0.3) | 8 | 94(0.3) | 10 | 1 | 6 | 112 | 23 |
| 12 | 15 | 500(1.5) | 8 | 157(0.5) | 15 | 2 | 6 | 562 | — |
| 13 | 11 | 484(2.0) | 8 | 78.5(0.25) | 50 | 2 | 8 | 450 | 6 |
| 14 | 13 | 300(1.24) | 8 | 48.6(0.16) | 50 | 2 | 8 | 288 | 2.5 |
| 15 | 13* | 111(0.5) | 8 | 78.5(0.167) | 15 | 1 | 8 | 125 | 7 |
| 16 | 13** | 1000(4.5) | 8 | 212(0.67) | 50 | 4 | 8 | 900 | — |

*the reaction mixture additionally contains 0.1 ml of triethylamine
**the reaction mixture additionally contains 25 ml of toluene

3. NLO Measurements

Dynamic (in situ) polarity measurements were carried out on the copolymers of Examples 12 and 13, the copolymers being polarized by means of a Corona polarization. For this purpose, the copolymer to be investigated was applied to a substrate which was coated with ITO (indium tin oxide) and served as one electrode. A needle or a wire to which a high voltage (about 5 kV) was applied relative to the ITO layer was fastened above the sample. The gas molecules present in the intermediate space were ionized and accumulated on the poorly conductive polymer layer, so that an electric field in which molecules having a permanent dipole moment were oriented was formed in the copolymer. When the high voltage was switched off, a residual charge still remained on the sample surface, which also made a contribution to the SHG signal. After elimination of this surface charge by wiping with a cloth impregnated with ethanol, the SHG signal achieved by the polarization was observed. The generation and elimination of the surface charge affected the curve in the form of signal fluctuations even during the measurement.

A neodymium YAG laser having a wavelength of 1064 nm was used for the measurements. The laser light produced therewith was attenuated in its intensity by means of filters so that the signal of the first harmonic was not too large and could not destroy the sample, since the chromophore 8 already exhibits marked absorption at the wavelength of the frequency-doubled light. After passing through the fundamental wave was coupled out via a filter, and the remaining signal was recorded at twice the frequency using a photomultiplier.

Films were applied to ITO-coated glass substrates by spin coating from a 20% strength by weight solution of the copolymer of Example 12 (glass transition temperature $T_g=163°$ C.) in cyclohexanone at 1500 rpm. These films were dried at 130° C. under reduced pressure and gave a desired film thickness of about 2 μm. The polarization experiments were carried out at different temperatures above and below the glass transition temperature. A voltage of 5 kV was applied for Corona polarization. Even after the polarization, the films still exhibited good optical quality.

A characteristic parameter for the mobility of the chromophores is the time constant τ for the increase in the SHG signal. The smaller the time constant, the more rapid is the increase in the SHG signal and hence the mobility. As a first approximation, this time constant is determined by single exponential behavior.

The polarization measurements were carried out at 180° C., ie. above the glass transition temperature, and at 150° C., ie. below or in the region of the glass transition temperature. The saturation value of the SHG signal at 180° C. was greater than in the case of polarization at 150° C. From the measured curves, the time constant τ was determined as 0.73 $min^{-1}$ for T=180° C. and as 1 $min^{-1}$ for 150° C. A further difference in the case of polarization above and below Tg was evident from a logarithmic plot. The increase in the SHG signal at 150° C. in the case of this plot was approximately linear up to saturation. At 180° C., two different slopes were clearly observed. This means that no single exponential behavior was present here and, for a better approximation, the model would have to be extended to include a further time constant in order better to describe the behavior.

When the sample was cooled slowly with the field switched on, the orientation produced was frozen and it was possible to investigate the long-term stability of the SHG signal at various temperatures. The SHG signal still had 97% of its initial intensity after 45 minutes. The orientation in the copolymer thus proved to be very stable. High long-term stabilities were also found in the investigation of the copolymer of Example 13 (Tg≈200° C.).

We claim:

1. A copolymer based on monomers selected from the group consisting of dicarboximides, alkenyl isocyanates and alkenylurethanes of the formula I

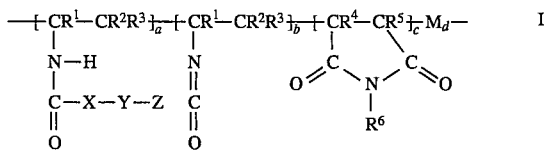

where $R^1$, $R^2$, $R^3$, $R^4$ and $R^5$, independently of one another are each selected from the group consisting of hydrogen, $C_1$–$C_{20}$-alkyl, $C_1$–$C_{20}$-alkyl which contains hetero atoms and substituted $C_1$–$C_{20}$ -alkyl;

$R^6$ is hydrogen or $C_1$–$C_{10}$-alkyl which is unsubstituted or substituted by phenyl or hydroxyl, or is $C_3$–$C_8$-cycloalkyl, or is phenyl or benzyl, each of which is unsubstituted or substituted by 1 to 4 $C_1$–$C_6$-alkyl or $C_1$–$C_6$-alkoxy groups, or is phenethyl, diphenylmethyl, naphthyl, carbazoyl, isobornyl, adamantyl or 9-fluorenyl;

X is O or NH;

Y is methylene, ethylene, propylene, isopropylene, straight-chain or branched $C_1$–$C_{20}$-alkylene,

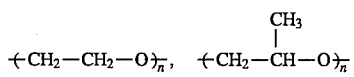

where n is from 1 to 15,

Z is hydrogen or a radical of formula V

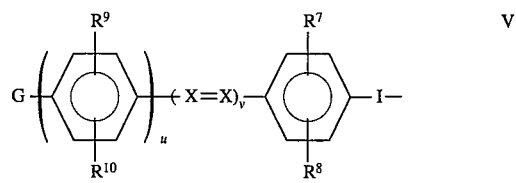

where $R^7$ to $R^{10}$ are identical or different and are each H, straight-chain or branched $C_1$–$C_{10}$-alkyl, $C_1$–$C_{10}$-alkoxy or $C_3$–$C_7$cycloalkyl, I is O or $NR^{11}$, $R^{11}$ is H, $C_1$–$C_{10}$-alkyl, $C_3$–$C_7$-cycloalkyl, phenyl, benzyl or phenethyl, u and v are each 0 or 1, X is CH or N and G is CN, $NO_2$, dicyanovinyl, tricyanovinyl, CHO or $CH=C(CO_2R^{11})$, or a radical of the formula VI:

where

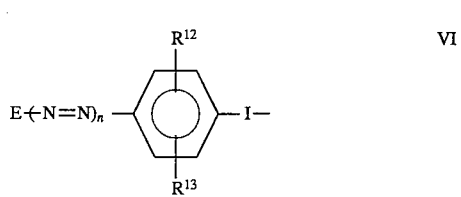

n is 0 or 1, $R^{12}$ and $R^{13}$, independently of one another, are each hydrogen, straight-chain or branched $C_1$-$C_{10}$-alkyl, $C_1$-$C_{10}$-alkoxy or $C_3$-$C_7$-cycloalkyl.

I is O or $NR^{14}$ wherein $R^{14}$ is hydrogen $C_1$-$C_{10}$-alkyl, $C_3$-$C_7$-cycloalkyl,

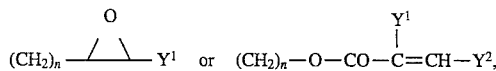

where n is 0 or 1, $Y^1$ is hydrogen or methyl and $Y^2$ is hydrogen or phenyl, and E is a radical of a diazo component which is derived from a five-membered aromatic heterocyclic amine which has from one to three hetero atoms selected from the group consisting of nitrogen, oxygen and sulfur in the heterocyclic ring and may be fused with a benzene, thiophene, pyridine or pyrimidine ring;

M is any copolymerizable monomer and a+b+c+d=1, where a and c each range from 0.3 to 0.7 and b and d each range from 0 to 0.3.

2. A copolymer as claimed in claim 1, wherein

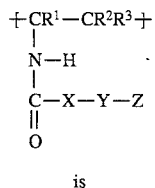

is

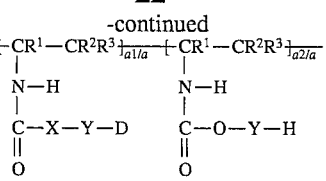

where a1/a and a2/a are each from 0.1 to 0.9 and a1+a2=a.

3. A copolymer as claimed in claim 1, wherein $R^6$ is phenyl or benzyl, each of which is unsubstituted or substituted by 1 to 4 $C_1$-$C_6$-alkyl or $C_1$-$C_6$-alkoxy groups, or is phenethyl, diphenylmethyl, naphthyl, carbazoyl, isobornyl, adamantyl or 9-fluorenyl.

4. A copolymer as claimed in claim 1, wherein $R^1$, $R^2$, $R^3$, $R^4$ and $R^5$ are each hydrogen.

5. A process for the preparation of a copolymer as claimed in claim 1 by reacting from 30 to 70 mol % of a compound of the formula III

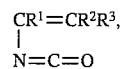   III with from 30 to 70 mol % of a compound of the formula IV

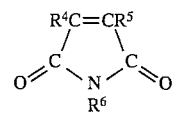   IV and, if required, up to 30 mol % of further monomers which differ from the compounds III and IV, in the presence of a free radical initiator, and subsequently reacting the resulting copolymer with a compound H—X—Y—Z.

* * * * *